Jan. 6, 1953     H. L. OLSON     2,624,267
ELECTRIC BREAD TOASTER

Filed May 13, 1949     3 Sheets–Sheet 1

INVENTOR
HENRY L. OLSON
BY *Cantwell & Lagaard*
ATTORNEYS

Jan. 6, 1953     H. L. OLSON     2,624,267
ELECTRIC BREAD TOASTER
Filed May 13, 1949     3 Sheets-Sheet 2

INVENTOR
HENRY L. OLSON
BY
ATTORNEYS

INVENTORS
HENRY L. OLSON
BY Caswell & Lagaard
ATTORNEYS

Patented Jan. 6, 1953

2,624,267

UNITED STATES PATENT OFFICE 2,624,267

ELECTRIC BREAD TOASTER

Henry L. Olson, Grand Haven, Mich., assignor to Camfield Manufacturing Company, Grand Haven, Mich., a corporation of Michigan Application May 13, 1949, Serial No. 93,059

10 Claims. (Cl. 99—327)

The object of the instant invention resides in providing an electric bread toaster constructed as hereinafter set forth and having the functions and advantages recited.

The bread toaster disclosed in this application consists of a case A in which is disposed a framework B. The framework B and associated parts provides two vertical bread ovens C into which the bread may be placed through suitable openings in the upper portion of the case A. Within the framework B is disposed two vertically movable bread racks D which support the bread within the ovens C and which are spring biased to nontoasting position. A timing mechanism E is adapted to determine the cooking period and operates to release a latching device F whereupon the bread racks are returned to normal position at the end of the cooking period. The timing mechanism includes a revoluble member having catch engaging means adapted to be engaged by a catch movable with the bread racks and forming part of the release F. The catch engaging means has a surface disposed transversely of the direction of movement of the catch, the angularity of which changes as the member rotates to cause said surface to approach parallelism with the direction of movement of the catch. Due to the change in angularity of the surface of the catch engaging means the friction between the catch and catch engaging means is greatly reduced at the point of release thereby making release positive and requiring only a small amount of energy.

In the drawings:

Fig. 4 is a fragmentary cross sectional view taken substantially on line 4—4 of Fig. 1.

Figs. 5, 6 and 7 are views similar to Fig. 4 showing the parts in altered positions.

Figure 2:
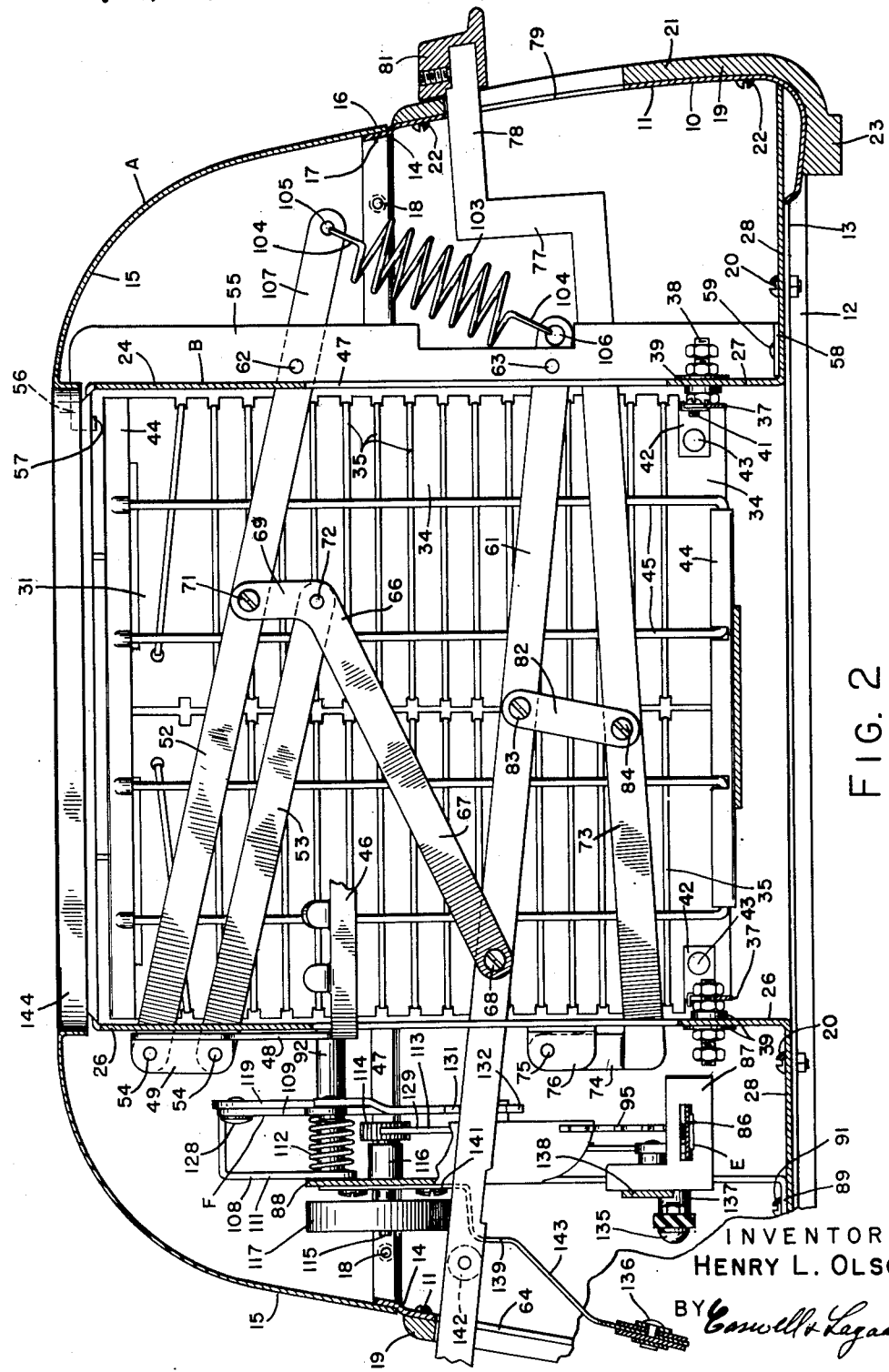
Fig. 2 is a longitudinal elevational sectional view of the toaster taken substantially on line 2—2 of Fig. 1.

The case A of my invention as best shown in Fig. 2 consists of a lower case section 10 which extends about the entire toaster and which has ends 11 and sides 12. The lowermost part of the case section 10 has a flange 13 extending inwardly therefrom and on which the toaster mechanism rests. The upper part of the section 10 has an offset 14 formed in the same and which provides a recess 17. Overlying the section 10 is an upper case section 15. This case section is dome-shaped in form and the lower marginal portion 16 of said case section is received within the recess 17 formed by the offset 14. Screws 18 extending through the lowermost marginal portion 16 and threaded into the offset 14 hold the parts of the case assembled. Attached to the ends 11 of case section 12 are end pieces 19 which are preferably constructed of some plastic material and which form ornaments for dressing up the case structure. These end pieces have body portions 21 which overlie the ends 11 of the case and are secured thereto by means of screws 22. These end pieces furthermore have feet 23 which are disposed beneath the section 10 and support the entire toaster above the table on which it rests to provide ventilation and retard the transfer of heat to the table. The section 15 of the case A is constructed with openings 144 which register with the bread ovens C and through which the bread may be inserted into said ovens and placed upon the bread racks D.

Within the case A is located the framework B which supports the mechanism of the invention. This framework consists of frame 24, of inverted U-shaped form, having an upper longitudinally extending frame member 25 and two vertically extending frame members 26 and 27 connected thereto. The frame members 26 and 27 have flanges 28 projecting outwardly therefrom and lying in a common plane. These flanges rest upon the flange 13 and support the frame structure through the lower case section 10. Screws 20 hold the framework B attached to the case A.

Within the framework B is provided four heating elements 29, 31, 32 and 33 which consists of sheets of mica 34 on which are wound suitable resistors 35. These heating elements in conjunction with the vertical frame members 26 and 27, form the two bread ovens C which are disposed between the heating elements 29 and 31 and between the heating elements 32 and 33. The heating elements 31 and 32 are also separated from one another to form a space 36 therebetween and in which certain of the mechanism of the invention is disposed. For supporting the heating elements 29, 31, 32 and 33 two bars 37 are employed which extend transversely of the frame members 26 and 27 and are attached thereto by means of screws 38. The said screws are insulated from the frame by insulating washers 39. Other screws 41 extend through said bars and through angle brackets 42 secured to the various heating elements by means of rivets 43. The heating elements 29, 31, 32 and 33 have reinforcing strips 44 secured to the upper and lower ends of the same and which also serve for attachment of guide wires 45. These guide wires are spaced from the resistors 35 and prevent the toast from coming in direct contact therewith and burning.

For supporting the toast within the oven C the two bread racks D are employed. These bread racks consist of elongated bars 46 which extend through slots 47 in the vertical frame members 26 and 27 and are guided for vertical movement therein. One end of each of said bars has an arm 48 bent outwardly therefrom and which terminates in a lug 49. The lugs 49 straddle two levers 52 and 53 and are pivotally connected thereto by means of rivets 54.

The lever 52 is pivoted to an upright 55 by means of a rivet 62. This upright is secured to the frame B in the following manner: The upper end of said upright has a finger 56 which extends over the horizontal frame member 25 and is formed with a lug 57 which projects downwardly through said frame member. The lower end of the upright 55 has a flange 58 projecting outwardly therefrom which is secured by means of a rivet 59 to the flange 28 of frame 24. Another lever 61 hereinafter referred to as a rack lever is also pivoted to the upright 55 by means of a rivet 63 and extends completely through the frame 24 and through a slot 64 in one of the ends 11 of the case section 10. This lever has attached to it a knob 65 by means of which said lever may be depressed. Extending between the lever 52 and the lever 61 is a bell crank 66 which has one long arm 67 pivoted to the lever 61 by means of a screw 68. The said lever has a short arm 69 which is pivoted to the lever 52 by means of a screw 71. Lever 53 is pivoted to the bell crank 66 by means of a rivet 72. Below the lever 61 is another lever 73. This lever extends completely through the frame 24 and its innermost end is formed with an upstanding arm 74. This arm is pivoted by means of a rivet 75 to a bracket 76 secured to the vertical frame member 26. The said lever has an offset 77 at its opposite end and which terminates in an extension 78 projecting through a slot 79 in the end 11 of case A. A knob 81 is attached to the projecting end of the said lever. The levers 61 and 73 are connected together intermediate their ends by means of a link 82 which is pivoted to said levers by screws 83 and 84. The levers 52, 53, 61 and 73 all operate in slots 85 formed in the two vertical frame members 26 and 27. The ends of both of the levers 52 and 61 project outwardly beyond the vertical frame member 27. These ends of said levers have attached to them a tension coil spring 103 which has its ends 104 hooked into holes 105 and 106 in the said levers. The end 107 of the lever 52 projects outwardly beyond the upright 55 an appreciable amount so that considerable movement is given to the lever 54 tending to urge the said lever upwardly and to move the bread racks D into non-toasting position.

Figure 1:
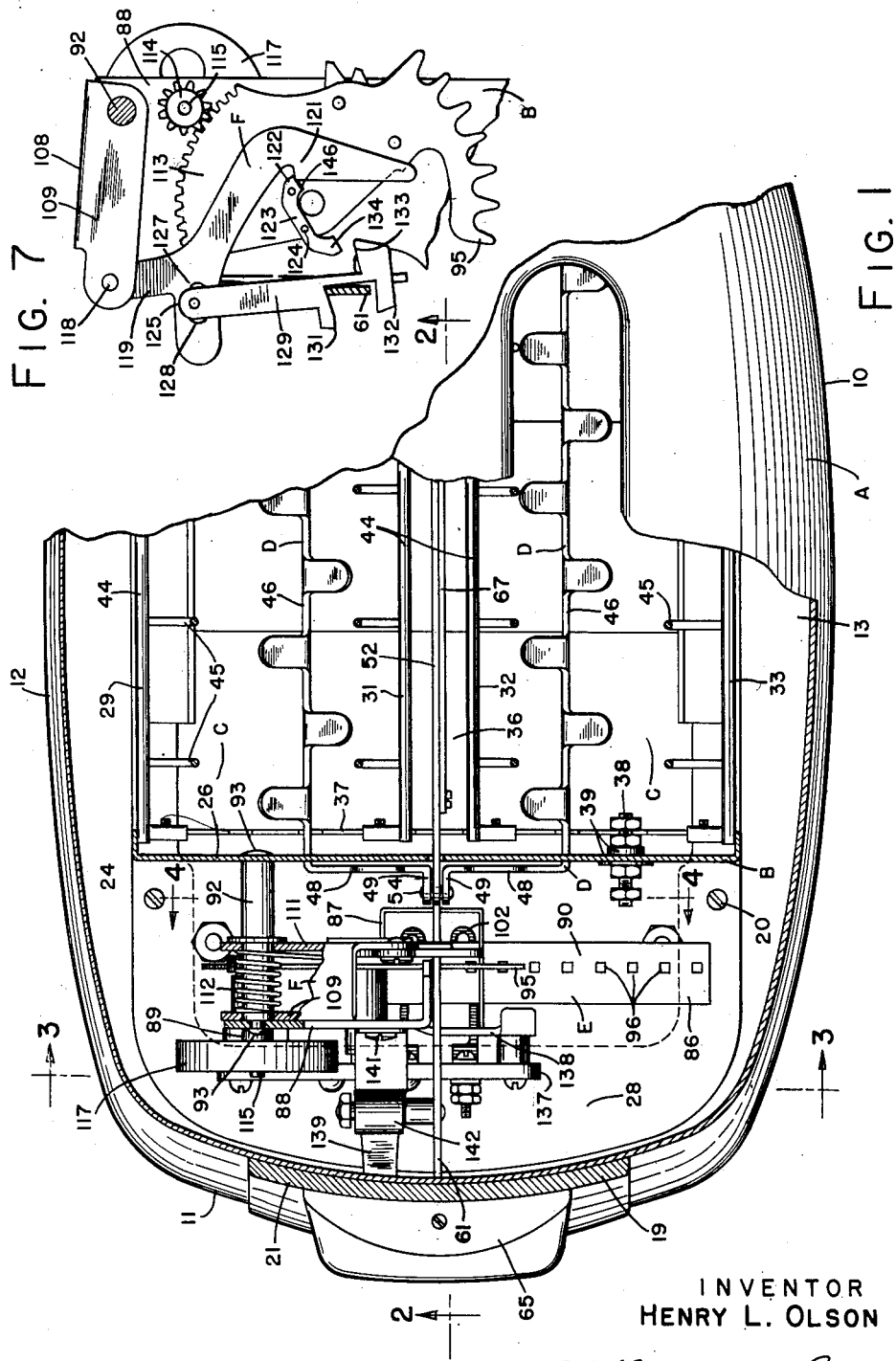
Fig. 1 is a plan view of a portion of an electric toaster illustrating an embodiment of my invention with portions broken away to illustrate the construction thereof.

The timing mechanism E on the invention is of the type disclosed in the patent to R. Sardeson 2,365,909 issued December 26, 1944. This timing mechanism includes a strip of bimetal 86 which is mounted for reciprocating movement in a guide 87. Guide 87 is attached to an end plate 88 forming part of the framework B. The end plate 88 has a foot 89 which rests upon and is attached to the flange 28 of frame member 26 by means of a screw 91. The upper end of the said end plate is held in proper relation with the vertical frame members 26 by means of a spacer 92. The ends of said spacer are reduced as indicated at 93 and extend through the plate 88 and the vertical frame member 26 and are riveted over as best shown in Fig. 1 to hold the parts attached to one another.

Pivotally mounted on a shaft 94 is a gear segment 95 which is adapted to cooperate with a rack 90 formed on the strip of bimetal 86 by means of spaced openings 96. The shaft 94 is secured to the plate 87. The gear segment 95 has attached to it a section 97 of a ratchet wheel, the teeth of which cooperate with a catch 98. Catch 98 is pivoted on a pintle 99 which is also attached to the plate 88. The said catch includes a finger 101 which rests on the bimetal and which is adapted to be raised to disengage the catch 98 from the section 97 of the ratchet wheel and release the gear segment 95, one tooth at a time. A spring 199 secured to the catch 98 and to the plate 88 urges the finger 101 against the strip of bimetal 86. The bimetal is heated by means of a heater 102 disposed within the guide 87. It will readily be comprehended that the rate of heating of the bimetal determines the length of time required for the operation of the timing mechanism E for each cooking period.

Figure 3:
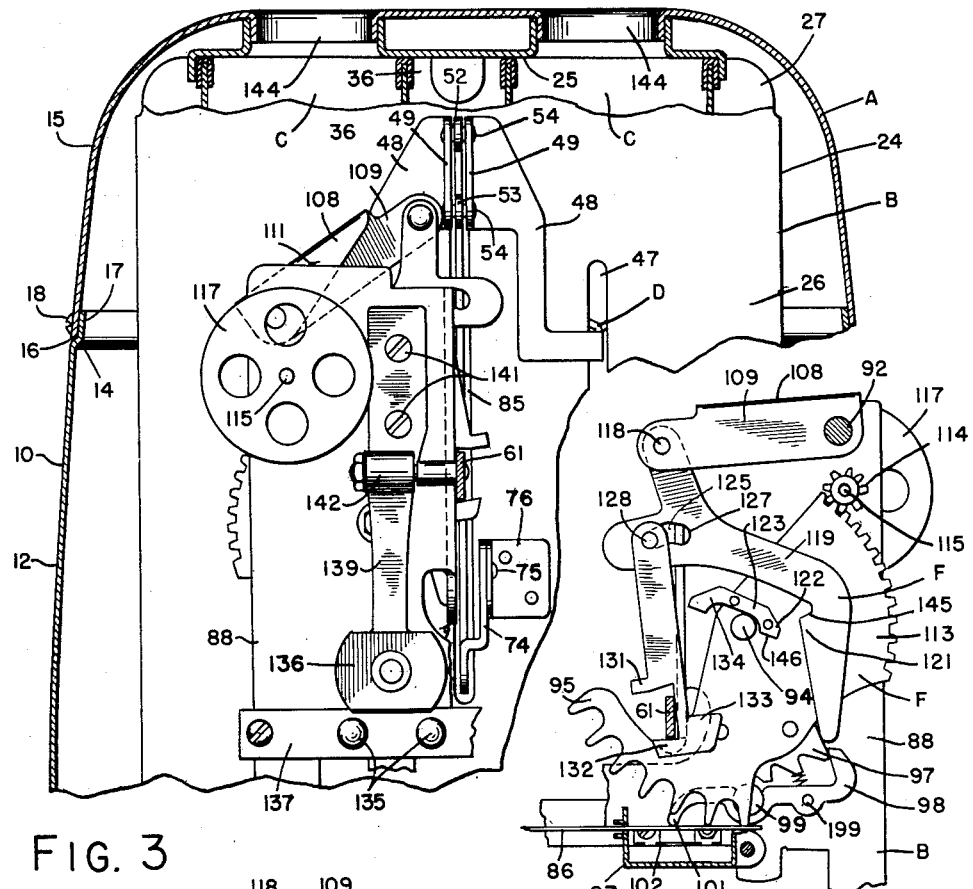
Fig. 3 is a fragmentary cross sectional view taken substantially on line 3—3 of Fig. 1.
Figures 4, 5, 6:
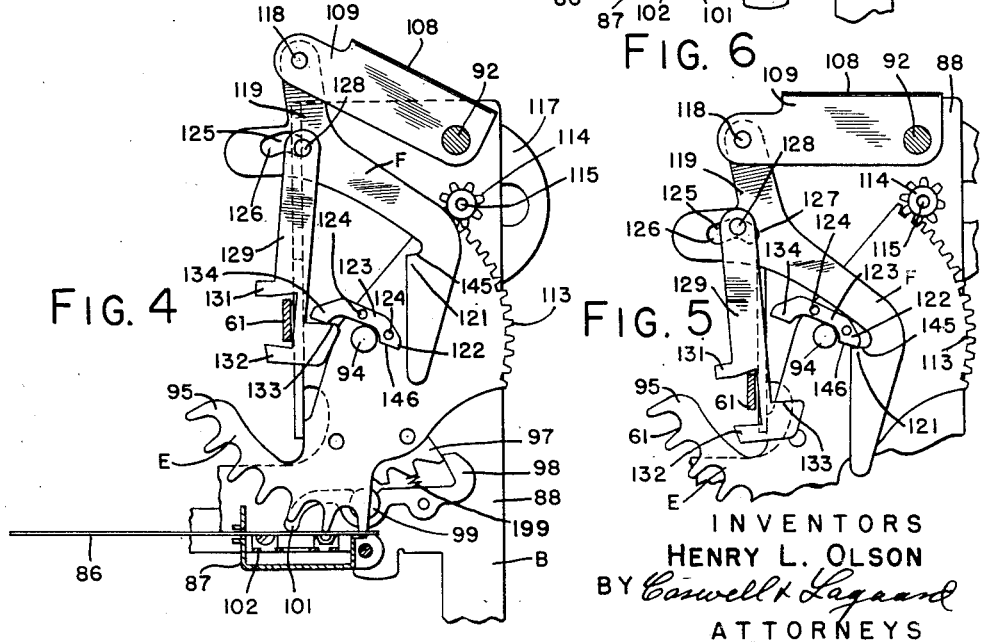

The latching device F includes a U-shaped arm 108 hereinafter referred to as a catch arm which has spaced flanges 109 and 111. This arm is pivotally supported on the spacer 92 which is in the form of a rod and which extends through the two flanges 109 and 111. A torsion spring 112 encircles the spacer 92 between the flanges 109 and 111 and is attached to flange 109 and to the plate 88 to cause said arm to swing normally upwardly as shown in Figs. 3 and 4.

The arm 108 has pivoted to the flange 109 thereof by means of a rivet 118 a depending latch 119. Latch 119 has a catch 121 at the lower end of the same which is formed with a surface 145 adapted to engage a corresponding surface 146 on a catch engaging member 122. This catch member forms part of a bar 123 which is secured to the gear segment 95 by means of rivets 124. The latch 119 is formed with an arcuate slot 125 having depressed ends 126 and 127. In this slot is mounted a pintle 128 which may travel freely from one end of the slot to the other. This pintle is secured to a depending link or connector 129 which is constructed with spaced fingers 131 and 132 at its lower end. These fingers straddle the lever 61 and when the said lever is moved downwardly the said link imparts to the latch 119 downward movement.

A gear segment 113 is formed on the gear segment 95 which is adapted to mesh with a gear pinion 114. This pinion is attached to a shaft 115 which is journaled in a bearing 116 mounted on the plate 88. A fly wheel 117 is also attached to the shaft 115 and the said fly wheel absorbs the energy produced by the spring 193 and allows the bread racks D to move less rapidly to normal position at the end of the timing period.

For resetting the timing device E link 129 is formed with a shoulder 133. This shoulder is adapted to engage a lug 134 on the bar 123 and to rotate the gear segment 95 in a direction opposite to that resulting from the operation of the timing mechanism E, thus resetting the timing mechanism.

In conjunction with the lever 61 a switch mechanism for energizing and deenergizing the heaters is employed which includes fixed contacts 135 and a movable contact member 136. The contacts 135 are mounted on an insulating support 137 attached to a portion 138 of plate 88. The contact member 36 is secured to the end of a spring 139 which is also attached to the plate 88 by means of screws 141. A cam follower 142 secured to the lever 61 engages a cam 143 on the spring 139 and moves the contact member 136 into engagement with the contacts 135.

The parts are normally arranged as shown in Figs. 3 and 4 with the pintle 128 disposed in the end 127 of slot 125. Downward movement of the lever 61 causes the latch 119 to travel downwardly. It will be noted that the slot 125 is exactly below the rivet 118 serving as the pivot for arm 108. In such position the force is applied to the latch 119 to the right of the vertical plane passing through the axis of the rivet 118. This causes the catch 121 to be drawn against the catch engaging member 122. When the said catch passes beneath said member the catch hooks onto the same as shown in Fig. 5. Upon release of the lever 61 the pintle 128 rides along the upper surface of the slot 125 and reaches an intermediate position as shown in Fig. 5. Spring 103 now urges the lever 52 and correspondingly the lever 61 upwardly and said lever through link 129 and catch 119 energizes the mechanism E. As the timing mechanism operates, gear segment 95 rotates and as it rotates the bar 123 rotates with it until it reaches the position shown in Fig. 7. As the bar 123 rotates, the angularity of the surface 146 thereof with respect to the direction of movement of the latch 119 varies and becomes more acute. The friction between the surfaces 145 and 146 hence becomes less and the direction of extent of the surface 146 approaches the direction of movement of the latch 119 so that the catch 121 rocks on the surface 146 and is released from the catch engaging member 122 without excess force. Upon further movement of the timing mechanism the latch is released and the lever 61 and associated parts move upwardly. The shoulder 133 on link 129 then engages the lug 134 on bar 123 and resets the timing mechanism. It will be noted that the lug 134 is to the right of the slot 125. This causes the pintle 128 to be forced into the end 127 of slot 125 where it resumes the position shown in Fig. 4. The latch 119 is now reset to again repeat its cycle.

If during the toasting period it becomes desirable to manually release the bread racks, the same can be accomplished by depressing the lever 61 a second time. The position of the parts during toasting is shown in Fig. 5. Downward pressure on the finger 132 causes the pintle 128 to travel to the end 126 of the slot 125 as shown in Fig. 6. This applies force to the latch 119 in a direction forcing the catch 121 out of engagement with the lug 122. Upon release of the lever the bread racks are returned to normal position through the action of the spring 103.

The advantages of the invention are manifest. The force used in operating the timing device is also used to effect release of the latching means thus eliminating two forces acting in opposition to one another as is the case with certain other types of bread toasters. By means of the structure of the instant invention less force is used in initiating operation of the toaster. With my invention friction is reduced at the time of release between the catch and catch engaging means so that release is accomplished with a minimum expenditure of energy and the sticking of the parts and failure of operation prevented.

Changes in the specific form of my invention, as herein described, may be made within the scope of what is claimed without departing from the spirit of my invention.

Having described my invention, what I claim as new and desire to protect by Letters Patent is:

1. In a bread toaster a frame, a bread rack carried thereby and movable from a toasting to a non-toasting position and vice versa, resilient means for moving said bread rack to a non-toasting position, a rack lever pivoted to said frame and movable in the same direction as said bread rack, connecting means between said bread rack and rack lever causing said lever and bread rack to move together and moving said bread rack into toasting position upon manual movement of said lever in opposition to said resilient means, a timing device including time controlled means and a revoluble member controlled thereby and adapted to make a portion of a revolution during the cooking period, the axis of said member being disposed adjacent and to one side of the plane of movement of said rack lever, a transversely disposed catch arm pivoted to said frame and extending toward the plane of movement of said rack lever, a latch pivoted to said catch lever at a locality substantially in the plane of said rack lever, a catch on said latch, catch engaging means on said revoluble member eccentric with the axis thereof and disposed on the side of said axis opposite the plane of movement of the rack lever and during the cooking period moving in the same direction as the bread rack when moving to non-toasting position, a catch on said latch adapted to engage said catch engaging means, said catch rocking on said catch engaging means during movement of said revoluble member to effect disengagement thereof at the end of the cooking period, said resilient means upon release of said catch, moving said rack lever to normal position and said bread rack to non-toasting position, and means operated by said rack lever and engageable with a part movable with said revoluble member for rotating said revoluble member in the opposite direction to reset the timing device.

2. In a bread toaster a frame, a bread rack carried thereby and movable from a toasting to a non-toasting position and vice versa, resilient means for moving said bread rack to non-toasting position, a rack lever pivoted to said frame and movable in the same direction as said bread rack and connected thereto to move the bread rack into toasting position, a timing device including time controlled means, a revoluble member controlled thereby and adapted to make a portion of a revolution during the cooking period, the axis of said member being disposed adjacent and to one side of the plane of movement of said rack lever, a transversely disposed catch arm pivoted to said frame and extending toward the plane of movement of said rack lever, a latch pivoted to said catch arm at a locality substantially in the plane of said rack lever, a catch on said latch, catch engaging means on said revoluble member eccentric with the axis thereof and disposed on the side of said axis opposite the plane of movement of the rack lever and during the cooking period moving in the same direction as the bread rack when moving to non-toasting position, said catch engaging means having a catch engaging surface extending transversely of the plane of movement of the rack lever and upon release forming an acute angle therewith and a catch on said latch adapted to engage said surface, said resilient means upon release of said catch, moving said rack lever to normal position and said bread rack to non-toasting position, and means operated by said rack lever and engageable with a part movable with said revoluble member in the opposite direction to reset the timing device.

3. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, a timing device for determining the cooking period including a revoluble member, a power transmission connected to said revoluble member, an escapement operated by said power transmission and controlling the rate of operation of said transmission and revoluble member, drive means for actuating said transmission and causing said revoluble member to rotate a portion of a revolution during the timed period, a catch, guide means mounted on said supporting structure and guiding said catch for movement in a certain direction, linkage between said catch and bread rack and holding said bread rack in bread toasting position when said catch is in one position, catch engaging means on said revoluble member having a surface engageable with said catch and disposed outwardly of the axis of said revoluble member, said surface extending substantially radially with reference thereto, and being adapted to move from a position substantially transverse to the direction of movement of said catch and to a position inclined relative thereto, said catch when said surface is in transverse position being retained in engagement therewith to hold the bread rack in toasting position, and when said surface reaches a sufficiently inclined position sliding off from the same to release said bread rack.

4. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, a timing device for determining the cooking period including a revoluble member, a power transmission connected to said revoluble member, an escapement operated by said power transmission and controlling the rate of operation of said transmission and revoluble member, drive means for actuating said transmission and causing said revoluble member to rotate a portion of a revolution during the timed period, a catch, guide means mounted on said supporting structure and guiding said catch for movement in a certain direction, linkage between said catch and bread rack and holding said bread rack in bread toasting position when said catch is in one position, catch engaging means on said revoluble member having a surface engageable with said catch and disposed outwardly of the axis of said revoluble member, said surface being adapted to move from a position substantially transverse to the direction of movement of said catch and to a position inclined relative thereto, said catch when said surface is in transverse position being retained in engagement therewith to hold the bread rack in toasting position, and when said surface reaches a sufficiently inclined position relative to the direction of movement of said catch engaging member sliding off from the same to release said bread rack.

5. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, a timing device for determining the cooking period including a revoluble member, a power transmission connected to said revoluble member, an escapement operated by said power transmission and controlling the rate of operation of said transmission and revoluble member, drive means for actuating said transmission and causing said revoluble member to rotate a portion of a revolution during the timed period, an arm, pivot means between said arm and supporting structure, means for limiting swinging of said arm from one position to another, a latch, pivot means between said latch and arm, a catch on said latch, linkage between said latch and bread rack and holding said bread rack in bread toasting position when said catch is in one position, catch engaging means on said revoluble member having a surface engageable with said catch and disposed outwardly of the axis of said revoluble member, said surface being adapted to move from a position substantially transverse relative to a line connecting the axes of said pivot for said latch at its two extreme positions and to a position inclined relative thereto, said catch when said surface is in transverse position being retained in engagement therewith to hold the bread rack in toasting position, and when said surface reaches a sufficiently inclined position sliding off from the same to release said bread rack.

6. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, a timing device for determining the cooking period including a revoluble member, a power transmission connected to said revolube member, an escapement operated by said power transmission and controlling the rate of operation of said transmission and revoluble member, drive means for actuating said transmission and causing said revoluble member to rotate a portion of a revolution during the timed period, a catch, guide means mounted on said supporting structure and guiding said catch for movement in a certain direction, linkage between said catch and bread rack and holding said bread rack in bread toasting position when said catch is in one position, catch engaging means on said revoluble member having a surface engageable with said catch and disposed outwardly of the axis of said revoluble member, said surface having an end located further from the axis of said revoluble member than the remaining portion thereof engageable with the catch, whereby said surface may move from a position substantially transverse to the direction of movement of said catch and to a position inclined relative thereto, said catch when said surface is in transverse position being retained in engagement therewith to hold the bread rack in toasting position, and when said surface reaches a sufficiently inclined position sliding off from the same to release said bread rack.

7. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, an actuating member, guide means for guiding said actuating member for movement in the direction of movement of said bread rack, linkage between said actuating member and bread rack and causing movement of said bread rack upon movement of said actuating member, a timing device for determining the cooking period including a revoluble member, a power transmission connected to said revoluble member, an escapement operated by said power transmission and controlling the rate of operation of said transmission and revoluble member, catch engaging means on said revoluble member and disposed on one side thereof outwardly from the axis of said revoluble member, a catch, guide means on said supporting structure guiding said catch for movement with said catch engaging member and toward and from the same, a connector connected to said catch and a part movable with said bread rack, said resilient means acting through said part and connector and urging rotation of said revoluble member to actuate said timing mechanism, said catch becoming disengaged from said catch engaging member upon said revoluble member reaching a predetermined position to release said bread rack and deenergize said timing mechanism, a lug on said revoluble member disposed outwardly from the center thereof and on the side opposite said catch engaging member and engaging means movable with said bread rack and in the same direction as said catch and having a shoulder engageable with said lug and disposed in spaced relation to said catch in the direction of movement thereof to cause engagement of said shoulder with said lug upon release of said catch from said catch engaging member, said engaging means causing rotation of said revoluble member in the other direction to reset the timing mechanism.

8. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, an actuating member, guide means for guiding said actuating member for movement in the direction of movement of said bread rack, linkage between said actuating member and bread rack and causing movement of said bread rack upon movement of said actuating member, a timing device for determining the cooking period including a revoluble member, a power transmission connected to said revoluble member, an escapement operated by said power transmission and controlling the rate of operation of said transmission and revoluble member, catch engaging means on said revoluble member and disposed on one side thereof outwardly from the axis of said revoluble member, a catch, guide means on said supporting structure guiding said catch for movement with said catch engaging member and toward and from the same, a connector connected to said catch and a part movable with said bread rack, said resilient means acting through said part and connector and urging rotation of said revoluble member to actuate said timing mechanism, said catch becoming disengaged from said catch engaging member upon said revoluble member reaching a predetermined position to release said bread rack and deenergize said timing mechanism, a lug on said revoluble member disposed outwardly from the center thereof and on the side opposite said catch engaging member and engaging means on said connector engageable with said lug and disposed in spaced relation to said catch in the direction of movement thereof to cause engagement with said lug upon release of said catch from said catch engaging member, said engaging means causing rotation of said revoluble member in the other direction to reset the timing mechanism.

9. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, an actuating member, guide means for guiding said actuating member for movement in the direction of movement of said bread rack, linkage between said actuating member and bread rack and causing movement of said bread rack upon movement of said actuating member, a timing device for determining the cooking period including a revoluble member, a power transmission connected to said revoluble member, an escapement operated by said power transmission and controlling the rate of operation of said transmission and revoluble member, catch engaging means on said revoluble member and disposed on one side thereof outwardly from the axis of said revoluble member, a catch, guide means on said supporting structure guiding said catch for movement with said catch engaging member and toward and from the same, and a connector connected to said catch and to said actuating member, said resilient means acting through said actuating member and connector and urging rotation of said revoluble member to actuate said timing mechanism, said catch becoming disengaged from said catch engaging member upon said revoluble member reaching a predetermined position to release said bread rack and deenergize said timing mechanism, a lug on said revoluble member disposed outwardly from the center thereof and on the side opposite said catch engaging member and engaging means movable with said bread rack and in the same direction as said catch and having a shoulder for engagement with said lug disposed in spaced relation to said catch in the direction of movement thereof to cause engagement of said shoulder with said lug upon release of said catch from said catch engaging member, said engaging means causing rotation of said revoluble member in the other direction to reset the timing mechanism.

10. In a bread toaster, a supporting structure, heating means carried thereby, a bread rack, guide means carried by said supporting structure and guiding said bread rack for movement to toasting or non-toasting position relative to said heating means, resilient means acting between said bread rack and supporting structure and urging said bread rack to non-toasting position, an actuating member, guide means for guiding said actuating member for movement in the direction of movement of said bread rack, linkage between said actuating member and bread rack and causing movement of said bread rack upon movement of said actuating member, a timing device for determining the cooking period including a revoluble member, a power transmission connected to said revoluble member, an escapement operated by said power transmission and controlling the rate of operation of said transmission and revoluble member, catch engaging means on said revoluble member and disposed on one side thereof outwardly from the axis of said revoluble member, a catch, guide means on said supporting structure guiding said catch for movement with said catch engaging member and toward and from the same, and a connector connected to said catch and to said actuating member; said resilient means acting through said actuating member and connector and urging rotation of said revoluble member to actuate said timing mechanism, said catch becoming disengaged from said catch engaging member upon said revoluble member reaching a predetermined position to release said bread rack and deenergize said timing mechanism.

HENRY L. OLSON.

REFERENCES CITED

The following references are of record in the file of this patent:

UNITED STATES PATENTS

| Number | Name | Date |
| --- | --- | --- |
| Re. 22,781 | Anderson | Aug. 20, 1946 |
| 1,176,285 | Gibney | Mar. 21, 1916 |
| 2,302,117 | Gomersall | Nov. 17, 1942 |
| 2,336,640 | Sardeson | Dec. 14, 1943 |
| 2,402,576 | Purpura | June 25, 1946 |
| 2,427,159 | Poole | Sept. 9, 1947 |